(No Model.)
J. P. MANNY.
LEMON JUICE EXTRACTOR.
No. 441,882. Patented Dec. 2, 1890.
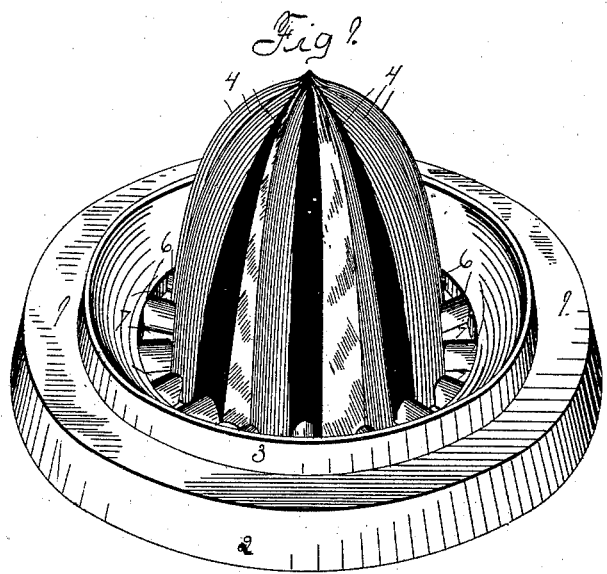
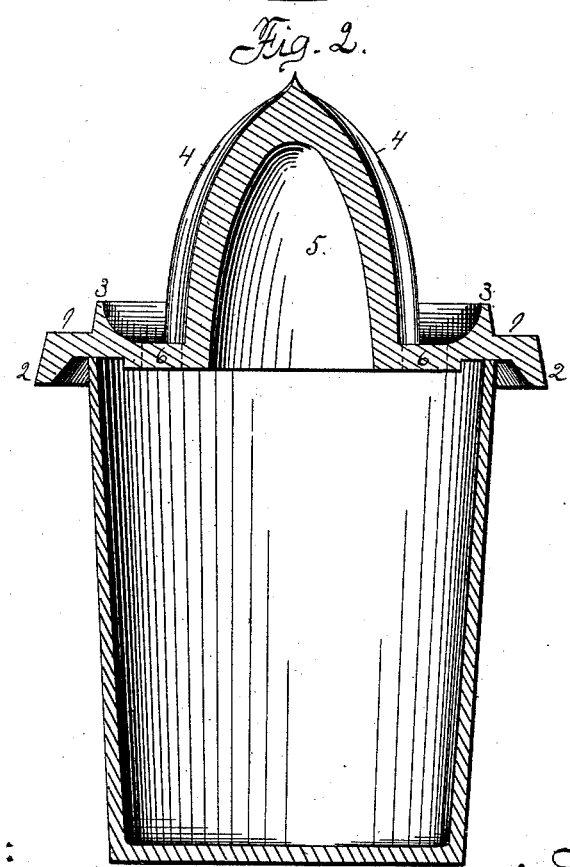
Witnesses:
C. M. Hollingsworth.
E. Behel.
Inventor:
John P. Manny.
By A. O. Behel
Atty.

UNITED STATES PATENT OFFICE.

JOHN P. MANNY, OF ROCKFORD, ILLINOIS.

LEMON-JUICE EXTRACTOR.

SPECIFICATION forming part of Letters Patent No. 441,882, dated December 2, 1890.

Application filed November 19, 1888. Serial No. 291,191. (No model.)

*To all whom it may concern:*

Be it known that I, JOHN P. MANNY, a citizen of the United States, residing at Rockford, in the county of Winnebago and State of Illinois, have invented certain new and useful Improvements in Lemon-Juice Extractors, of which the following is a specification.

The object of this invention is to construct a lemon-juice extractor provided with a base portion having a depending flange of a form to receive the open end of a suitable receptacle, said base having a portion of its bottom developed into and forming a part of the ribbed conical extractor and a series of openings through which the extracted juice will pass into the receptacle, the upper surface of the base being recessed to hold the pithy portion of the lemon.

In the accompanying drawings, Figure 1 is an isometrical representation of my improved lemon-juice extractor. Fig. 2 is a vertical central section of the extractor resting upon a receptacle.

The base portion 1 of my extractor is of circular form, having an annular flange 2 depending from its under side. This flange prevents the displacement of the extractor when placed upon a tumbler or other suitable receptacle. An annular rib 3, rising from the upper surface of the base portion, forms a recess for holding the pithy portion of the lemon and seeds from which the juice has been extracted.

The extractor proper rises from the upper surface of the base and is of conical or preferably, as shown, of hyperbolic outline in form, and consists of ribs 4, projecting outwardly from its face, leaving depressions between the ribs. The conical extractor is formed hollow by developing a portion of the base into the extractor, as shown at 5, Fig. 2. This extractor is connected to its base at proper intervals by radiating ribs 6. Openings 7 between the ribs 6 permit the passage of the extracted juice into the receptacle placed beneath the extractor.

As shown in the accompanying drawings, each alternate rib 6 forms a prolongation of one of the ribs 4 on the face of the extractor.
In use I cut a lemon transverse to its lengthwise axis about the center thereof and press one-half onto the ribbed extractor and oscillate it thereon, which extracts the juice from the fruit. The many ribs of the extractor will necessitate but a slight oscillation of the lemon in order to extract the juice.

By this construction of a lemon-juice extractor of a single piece of material I produce a simple and efficient means of extracting all the juice from the lemon or other similar fruit without extracting the oil of the rind or other objectionable substance, and the ribs connecting the extractor with its base serve as a strainer to separate the juice from the pithy portion and seeds of the fruit, and the cup-shaped recessed upper portion will hold and prevent the overflow of the objectionable substance.

By experience I have demonstrated that glass is the best material from which to manufacture my improved lemon-juice extractor, owing to its non-corroding quality and cheapness of construction, and I therefore base a claim upon such material.

I am aware that extractors have been made containing a flattened cone placed in one arm of a pair of jaws or levers and a cup adapted to fit over such cone in the other arm, whereby the juice can be expelled from the lemon by direct pressure upon the outside, produced by closing the jaws upon it. I am also aware that in such extractors there have been spouts and openings in the lower half through which the juice can run. My invention is not related to such device, but consists in an extractor formed with a cone having projections upon its outer surface, formed so as to easily enter the pulp, dividing it into thin lines, when by a slight oscillating or rotating motion the thin lines of pulp are pressed against the sides of the ribs and the juice is released by lateral (not crushing) pressure and is free to follow down the channels between the ribs until reaching the base which supports the cone. This base portion is of proper form to rest upon a tumbler or other convenient juice-receptacle, and is perforated, so that the liberated juice can pass directly through into the receptacle.

I am also aware that extractors have been made consisting of a cone with sharpened projections (knives) attached to its outer surface, such cone being connected with a perforated base by screws or bolts, the base in turn being connected to legs, which hold it in position, and with elaborate mechanical devices to operate the lemon while expressing the juice. My improvement consists in constructing a cone with juice-releasing projections on its outer surface, with a perforated base adapted by its form to rest directly upon a juice-receptacle, all the parts being integral and in such form that no appliance for manipulating the lemon is necessary, the hand of the operator being sufficient.

I claim as my invention—

1. A lemon-juice extractor consisting of a base and a substantially solid conoidal portion uprising from the base and formed integral therewith, the conoidal portion being provided with juice-releasing projections extending outwardly from its surface and formed integral therewith, the base being adapted to receive the juice as it flows from the conoidal portion and having suitable juice-outlets, the base and the conoidal portion with its projections forming a complete extractor, substantially as described.

2. A lemon-juice extractor comprising a vertical cone having a solid surface with edged projections, a laterally-projecting base portion with openings beneath the grooves formed between said edged projections, and a supporting-flange.

JOHN P. MANNY.

Witnesses:
A. O. BEHEL,
E. BEHEL.